United States Patent
Kieren

(10) Patent No.: US 6,711,251 B1
(45) Date of Patent: Mar. 23, 2004

(54) LOCAL NUMBER PORTABILITY CROSS CONNECT SWITCH AND METHOD

(75) Inventor: Joseph Raymond Kieren, San Ramon, CA (US)

(73) Assignee: SBC Technology Resources Inc, Austin, TX (US)

( * ) Notice: Subject to any disclaimer, the term of this patent is extended or adjusted under 35 U.S.C. 154(b) by 427 days.

(21) Appl. No.: 09/656,670

(22) Filed: Sep. 7, 2000

(51) Int. Cl.$^7$ ................................................ H04M 7/00
(52) U.S. Cl. .................................. 379/221.13; 379/327
(58) Field of Search ................................. 379/326, 327, 379/323, 221.13

(56) References Cited

U.S. PATENT DOCUMENTS

| | | | |
|---|---|---|---|
| 5,619,562 A | * 4/1997 | Maurer et al. | 379/201.05 |
| 5,854,835 A | * 12/1998 | Montgomery et al. | 379/112.06 |
| 6,035,029 A | * 3/2000 | Little et al. | 379/219 |
| 6,301,351 B1 | * 10/2001 | King | 379/221.01 |

* cited by examiner

Primary Examiner—Ahmad F. Matar
Assistant Examiner—Quynh H. Nguyen

(57) ABSTRACT

A cross-connect switch for implementing local number portability between a current local service provider originating switch and a desired local service provider ported switch. The cross-connect switch comprises an Originating Dial Tone (ODT) port, a Ported Dial Tone (PDT) port, a Main Distribution Frame (MDF) port, a switch, and a controller. The ODT port receives a first line from the originating switch associated with a subscriber's directory number. The PDT port receives a second line from the porting switch associated with said subscriber's directory number. The MDF port connects the cross-connect switch to a MDF associated with the originating switch and the ported switch. The controller is in operative communication with the switch, ODT, PDT and MDF ports. The controller includes a processor programmed to receive a predetermined signal from the ODT port and, in response, establish a communication channel between the PDT port and the MDF port, and open a communication channel between the ODT port and the MDF port. With the present device, the programmable switch can be implemented and triggered remotely to coordinate local number portability migration requests from a current local service provider to a desired local service provider.

6 Claims, 3 Drawing Sheets

LOCAL NUMBER PORTABILITY CROSS CONNECT SWITCH AND METHOD

TECHNICAL FIELD

The present invention relates generally to telecommunication systems, and more particularly, relates to a cross connect switch and method for enabling local number portability in an intelligent switched telecommunications network.

BACKGROUND OF THE INVENTION

Local Number Portability (LNP) allows telephone service subscribers to retain their same directory number, at the same location, when a subscriber changes from one local telephone service provider to another. Telephone number portability was mandated by the Telecommunications Act of 1996.

Telephone calls are routed from a calling subscriber to a called subscriber through the public switched telephone network. A central office switch is used for connecting the subscriber telephone lines. Subscribers connected to a common switch, or End Office (EO) are assigned a unique directory number, commonly referred to as a telephone number. The format of the directory number is NXX-XXXX, where "N" refers to any digit except zero or one and "X" refers to any one of 10 digits. Directory numbers are assigned in blocks of ten thousand to each Local Exchange Carrier (LEC). The first three digits of the directory number is referred to as the exchange code. Each exchange code corresponds to a particular switch or EO. The last four digits of a directory number are referred to as the subscriber's line code. The United States is also divided into "area codes," more technically referred as Numbering Plan Area (NPA) codes. Thus, each telephone subscriber is associated with a unique 10 digit directory number comprising the three digit NPA code, the three digit exchange code (NXX) plus a four digit line number (XXXX).

The area code and exchange code prefix is used to route the call to the serving End Office. At the End Office, the local switch routes the call to the subscriber's line which is designated by the last four digits of the directory number. Thus, when a calling party places a telephone call, the first six digits of the dial directory number uniquely identify the terminating switch for the telephone call. The originating switch relies on this relationship to determine the most efficient routing path from the originating switch to the terminating switch at the End Office. Specifically, each switch typically includes a database that cross-references the area code, exchange code prefixes (NPA-NXX) to the various switches. The originating switch then routes the telephone call to the correct terminating switch, which, in turn, further routes the telephone call to the correct subscriber telephone line.

With the passage of the Telecommunications Act of 1996, more than one local telephone service provider in the same geographic area may install and maintain the switching equipment required to provide local telephone service. Indeed, their respective switches can be located in the same building. Local telephone service subscribers can then change their telephone service providers by having the lines servicing their premises disconnected from their previous local telephone service provider and reconnected to their new local telephone service provider. This disconnection and reconnection is referred to as a "cutover," and may take place at any point in the telephone line circuit to a subscriber's premises. For example, a subscriber line may be cutover at the terminal jack located at the subscriber's premises, at the local telephone service provider's distribution frame, or at any other point in the circuit. Local number portability requires that a subscriber and directory number be re-assigned from the switch associated with the present local telephone service provider to the switch associated with the new local telephone service provider. In a local number portability environment, therefore, the area code-exchange code portion of a directory number will not uniquely identify the switch servicing the line assigned to that directory number. Accordingly, additional telephone call routing procedures are required to allow an originating switch that initially receives a telephone call to determine the correct terminating switch. This is typically accomplished by a LNP database that cross-references individual is portable directory numbers to the various switches.

Accordingly, in a LNP environment, originating stations throughout the public switched telephone network refer to their respective LNP databases to determine the terminating stations that service ported subscriber telephone lines. Whenever a subscriber changes local telephone service providers but wishes to maintain the same directory number, all of the LNP databases must be programmed with the porting subscriber directory number and an identification code for the new terminating switch. Until the porting subscriber line is physically cutover from the original terminating switch to the new terminating switch, telephone calls directed to the subscriber directory number must be routed to the prior telephone service provider's terminating switch. After the subscriber line has been cutover, however, telephone calls directed to the subscriber's directory number must be routed to the new telephone service provider's terminating switch. Timing problems, therefore, arise because the physical cutover of the subscriber line occurs at a particular time instant. The various LNP databases, on the other hand, cannot be reprogrammed at the same instant. Thus, subscribers may experience interruptions in phone service until the LNP databases can be updated to reflect the relationship between the subscriber's directory number and the new telephone service provider's terminating switch. In addition, coordinating the physical cutover and database updating imposes scheduling demands upon service provider personnel. Thus, there exists a need for an improved system and method for enabling local number portability.

BRIEF DESCRIPTION OF THE DRAWINGS

Advantages of the invention will become apparent upon reading the following detailed description and appended claims and upon reference to the accompanying drawings.

In the drawings.

DESCRIPTION OF THE PREFERRED EMBODIMENT

Figure 1:
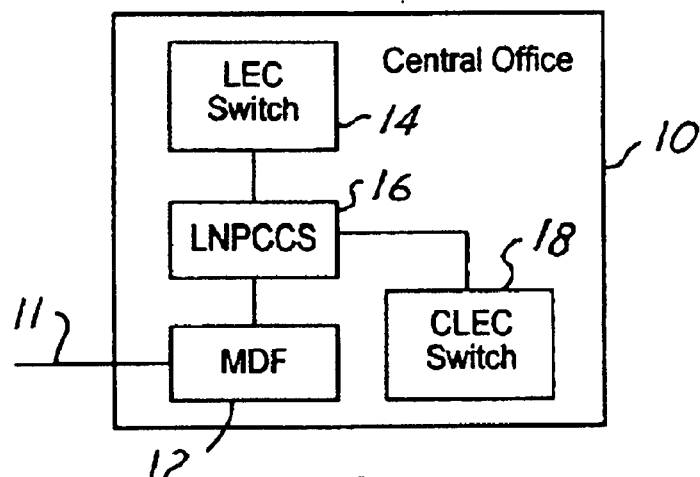
FIG. 1 is a schematic block diagram of the present invention in a central office environment.

Referring now to FIG. 1, there is shown a schematic block diagram of one embodiment of the present invention in a central office (CO) environment. The central office 10 is the site where the Local Exchange Carrier's (LEC) equipment resides which routes calls to and from customers served by the LEC. Telephone calls routed to the central office 10 enter the building on communication line 11 and are directed to the Main Distribution Frame (MDF) 12. The three-digit exchange code associated with the incoming dial directory number is routed to the corresponding LEC switch 14, and specifically, to that portion of the switch corresponding to the subscriber's line code. As described above, in order to implement LNP, the physical routing of a subscriber line must be cutover from the originating switch such as LEC switch 14 to the ported switch such as the Competitive Local Exchange Carrier (CLEC) switch 18. The Local Number Portability Cross Connect Switch (LNPCCS) 16 accomplishes the cutover by switching the connection to the MDF from the originating switch to the ported switch upon receiving a predetermined signaling sequence as described in more detail below.

Figure 2:
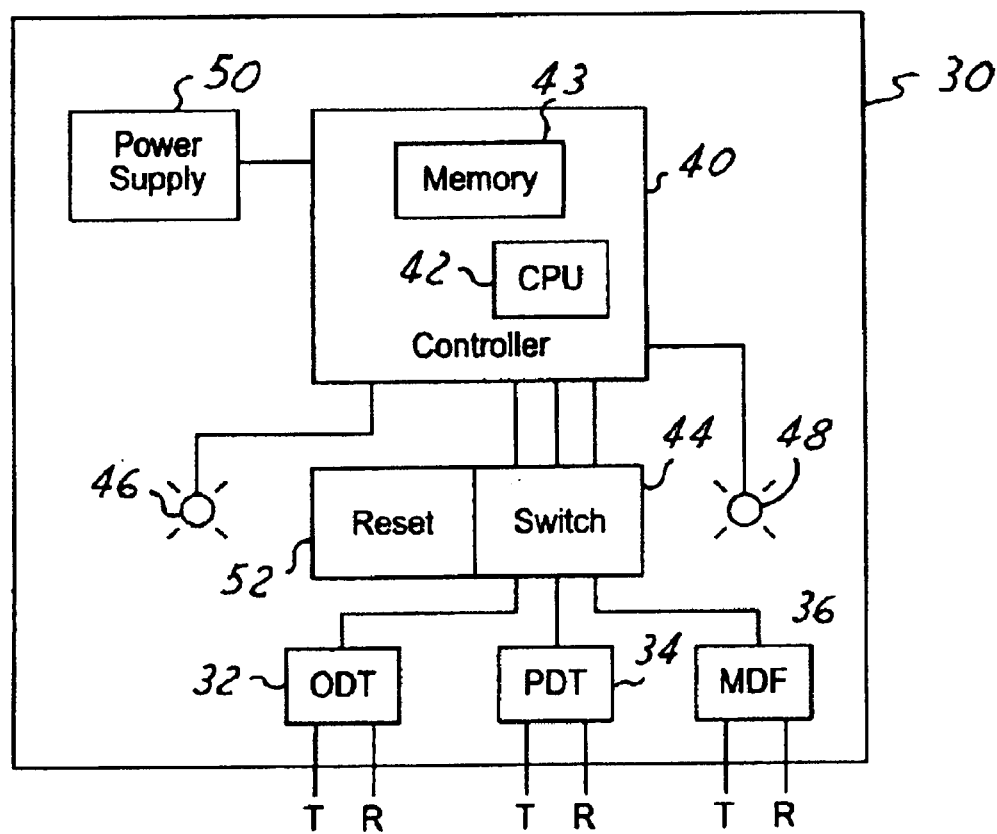
FIG. 2 is a schematic block diagram of one embodiment of the LNPCCS according to the present invention.

Referring now to FIG. 2, there is shown a schematic block diagram of one embodiment of the LNPCCS 30 according to the present invention. The LNPCCS 30 comprises an Originating Dial Tone (ODT) port 32 for receiving the line connection from the originating switch associated with a subscriber's directory number, a Ported Dial Tone (PDT) port 34 for receiving the line connection from the porting switch associated with the subscriber's directory number, and a Main Distribution Frame (MDF) port 36 for connecting the LNPCCS 30 to the Main Distribution Frame associated with the originating switch and the ported switch. Each of the ports 32, 34, 36 include terminal blocks for the tip and ring portions of the twisted wire pair. Preferably, the LNPCCS 30 is installed in the Central Office wiring room on the MDF. The wiring associated with each of the ports 32, 34, 36 preferably supports 48 volts DC (normal telephone line power) and 96 volts AC (telephone ringing generator).

The LNPCCS 30 also includes a switch 44 connecting the ODT port 32 and PDT port 34 to the MDF port 36, and a controller 40 in operative communication with the switch 44, ODT port 32, PDT port 34 and MDF port 36. The switch is connected to the ports such that the ODT path is normally closed and the PDT path is normally open. In other words, the default switch connection is a closed loop from the ODT port 32 to the MDF port 36 and an open loop between the PDT port 34 and the MDF port 36. Preferably, the switch 44 is a double-pole, double-throw relay-type switch such as is available from NEC Corp. as model ED2-5T. Light emitting diodes (LEDs) 46, 48 indicate the state of the switch. The controller 40 includes a processor 42 and associated memory 43. An example of a suitable controller is model PIC16C505 available from Microchip Corp. The controller 40 and "Arm" LED 46 are line powered from the ODT side before the trigger signal is received by the controller. After receipt of the trigger signal, the "Trip" LED 48 and controller 40 are line powered from the PDT side of the device.

The "Arm" LED 46 is active when the ODT port 32 and MDF port 36 are wired and the switch 44 is ready to receive the trigger signal. The trigger signal is preferably a Mechanized Loop Testing (MLT) tracking tone which can be received from either the ODT port 32 or the PDT port 34. When the trigger signal is received, the "Trip" LED 48 is activated to alert an operator of the state of the switch.

A power supply 50 is also included to provide alternative power to the switch 44 and controller 40. Preferably, power is supplied to the ODT side of the device until the switch is activated and the unit is later removed from the MDF. A manual override in the form a reset switch 52 is also provided to "build back" or re-establish the original connection from the ODT port 32 to the MDF port 36 after the switch 44 has been activated. In such cases, the power supply 50 drives the switch 44 to close the ODT path and open the PDT path to the MDF.

Figure 3:
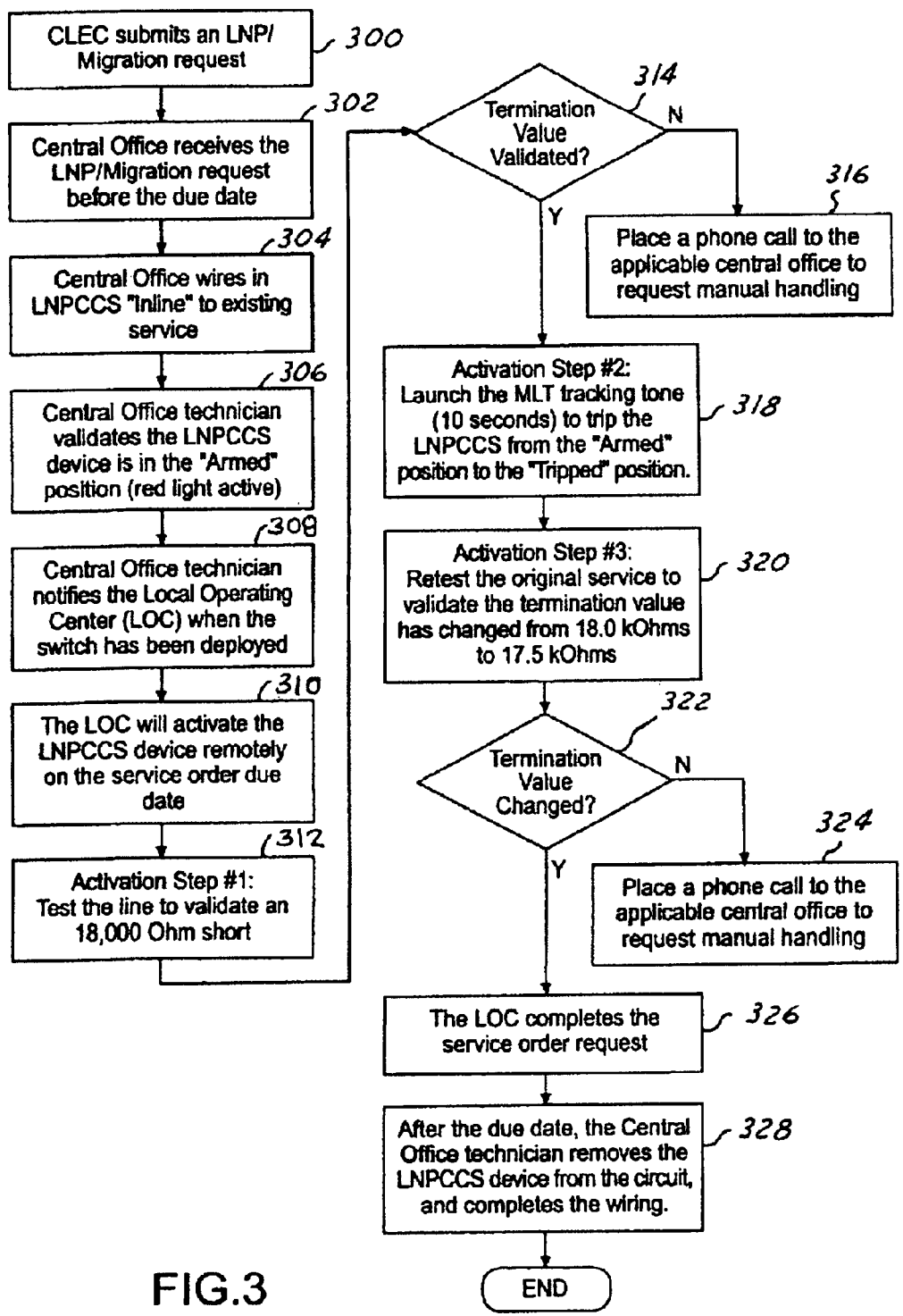
FIG. 3 is a logic flow diagram of one method of implementing the LNPCCS of the present invention.

Referring now to FIG. 3, there is shown a logic flow diagram of one method of implementing the LNPCCS of the present invention. The method of implementing local number portability with the LNPCCS begins in step 300 when a CLEC submits an LNP migration request to the telephone service subscriber's present local exchange carrier. The migration request represents the subscriber's desire to change service providers. In step 302, the LEC creates an internal service order to process the CLEC's LNP migration request. At this time, a due date for the LNP migration is decided upon between the CLEC and the customer, and the CLEC and LEC.

In step 304, the central office technician wires the LNPCCS "in line" to the existing telephone service. This is accomplished by wiring in the jumper from the original office equipment to the originating dial tone (ODT) port on the LNPCCS device, and the jumper from the main distribution frame (MDF) port to the vertical frame or MDF, thereby completing the original circuit path. These connections are made by inserting the "tip" and "ring" wire pair into the respective ODT and MDF tip and ring ports on the LNPCCS device. This process is also repeated for the tip and ring wire pair for the ported dial tone (PDT) port to the CLEC's switching equipment. In step 306, the central office technician validates that the LNPCCS device is in the "armed" position which is indicated by the red light emitting diode (LED). When the armed LED is active, it indicates to the technician that the LNPCCS has been properly connected in line with the customer's original circuit path. The central office technician can then notify the local operating center that the switch has been deployed such as in step 308.

Once the LNPCCS is armed and ready, the local operating center activates the device remotely on the service order due date, in step 310. The activation process begins in step 312 by testing for the presence of a predetermined resistance on the ODT side when the switch is in the ODT state. Preferably, the line is tested for an 18 kOhm short from ODT side. At this time, the processor and the ODT LED are line powered from the ODT side of the circuit before the activation tone is received. In step 314, a check is made as to whether the termination value has been validated. Specifically, the tip to ring resistance of the ODT port when the switch is in the ODT to MDF state is tested to detect a predetermined resistance value which, in this example, is 18 kOhm. If not, in step 316, the central office is contacted and the request made to check the integrity of the connection or manually cutover the service migration request.

If the line has been validated, in step 318, the device is switched by signaling a predetermined tone from either the ODT or PDT side of the device to trip the LNPCCS from the armed position to the "tripped" position. Preferably, the signaling tone is a Mechanized Loop Testing (MLT) tracking tone of approximately 10 second duration transmitted on the ODT side of the device. The MLT tone is preferably a 577.5 Hz signal of 3.25V amplitude that is pulsed on for 100 ms and off for 100 ms for a pulse train duration of at least two seconds. The signal is delivered between the tip and ring connections. This signaling tone is desirable because it is a standardized signal available to all telephone service providers, yet is unique enough that a device is unlikely to be accidentally or prematurely tripped by normal data or voice traffic over the original subscriber loop. After reception of the signaling tone, the green tripped LED is powered from the PDT side of the device. In addition, subsequent triggering tones can be used to toggle the state of the switch.

To ensure the device has been properly activated, in step 320, the original service is re-tested to validate that the termination value has changed by a predetermined amount. Preferably, the tip to ring termination value has changed from 18 kOhms to 17.5 kOhms on the ODT port when the switch is in the PDT to MDF state. If the termination value has not changed, as indicated in step 322, the central office is again contacted in step 324 to troubleshoot these device connections. Otherwise, in step 326, the local operating center completes the service order request by modifying the CLEC database records to indicate the CLEC's terminating switch for the associated customer's directory number.

Preferably, as shown in step 328, the LNPCCS device is removed from the circuits after a predetermined period of time and the circuit change is hard-wired without disrupting service, such that the LNPCCS unit is now available for reuse with other service order requests.

Figure 4:
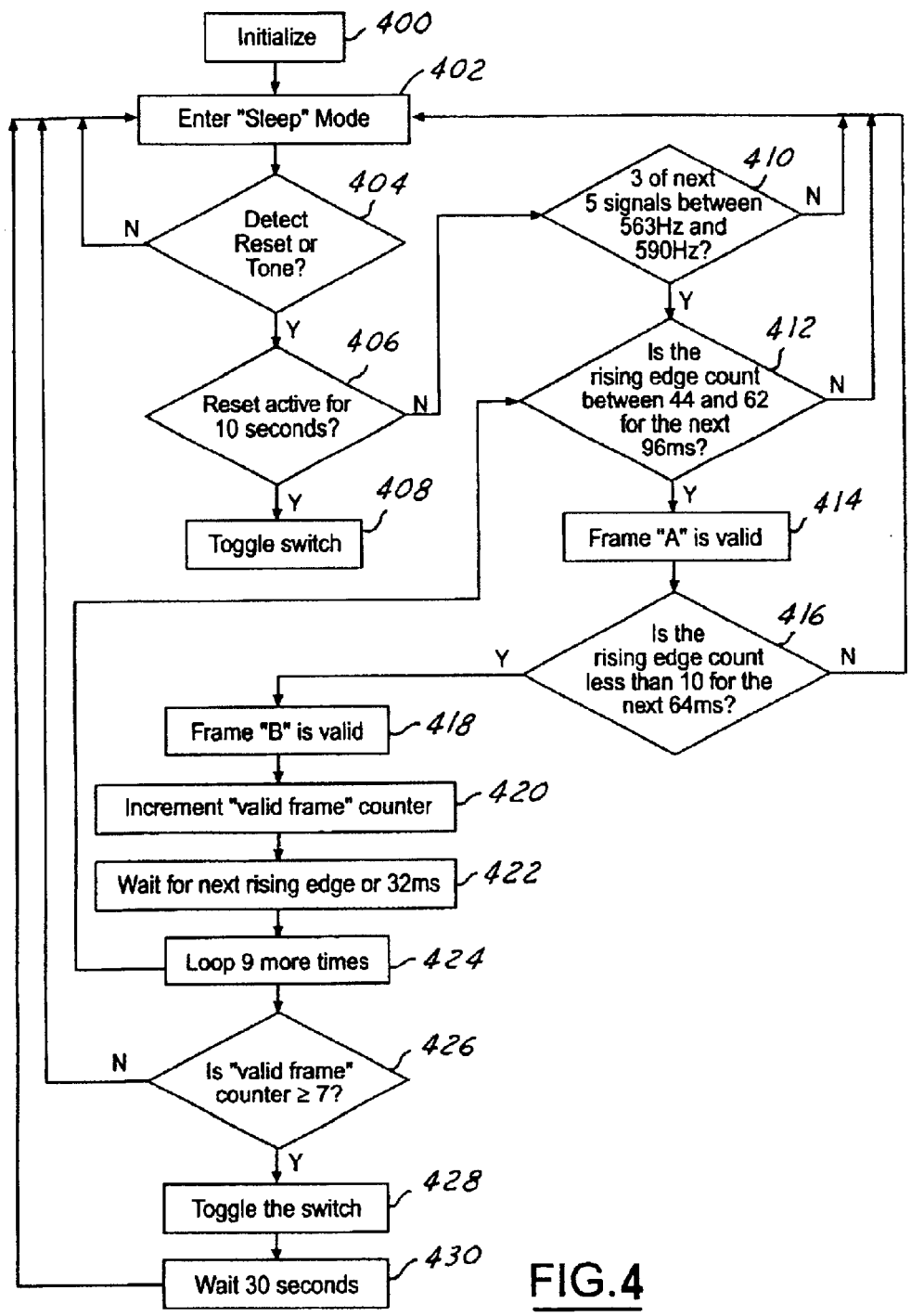
FIG. 4 is a logic flow diagram of another method of activating the LNPCCS of the present invention.

Referring now to FIG. 4, there is shown a logic flow diagram of another method of activating the LNPCCS of the present invention. The logic diagram of FIG. 4 describes one example of a specific MLT tracking tone implementation. At the start of the logic, it is assumed that the LNPCCS is correctly connected between the MDF and ODT and PDT switches. At this point, the LNPCCS is line powered from the ODT side of the device by the 48 VDC line voltage. This power is regulated by the power supply to 5.0 VDC at 3.75 mA. The logic begins in step 400 by initializing all program variables. This includes testing the switch connection to insure that the LNPCCS is in the ODT to MDF state, and activating the "Armed" LED. In step 402, the controller enters a "sleep" mode and waits for the activation signal.

In step 404, unless the Reset button on the device is activated, or a tone received, the controller remains in the sleep mode. Otherwise, in step 406, if the Reset button is activated for a predetermined period of time, the switch is activated to toggle the port (either ODT or PDT) connected to the MDF as shown in step 408.

If a tone is detected in step 404, steps 410 through 426 determine if the tone is the desired signaling tone. In this example, the desired signaling tone is an MLT tone consisting of a 577.5 Hz audio tone with a 5 Hz cadence. Accordingly, in steps 410 and 414, the "on" portion of the desired pulse train is detected and validated. Similarly, in steps 416 through 422, the "off" portion of the desired pulse train is detected and validated. The validity of the overall signal is assured in steps 424 and 426 by repeated detection of the predetermined signal for a threshold number of cycles. If the signal has been validated, the logic continues to step 428 where the switch is toggled to change the port (ODT or PDT) connected to the MDF. The devices then pauses for a predetermined period of time, during which time, the device power can be changed from the ODT side to the PDT side, for example.

What is claimed is:

1. A cross-connect switch for implementing local number portability between a current local service provider originating switch and a desired local service provider ported switch comprising:

an Originating Dial Tone (ODT) port for receiving a first line from said originating switch associated with a subscriber's directory number;

a Ported Dial Tone (PDT) port for receiving a second line from said porting switch associated with said subscriber's directory number;

a Main Distribution Frame (MDF) port for connecting said cross-connect switch to a MDF associated with said originating switch and said ported switch;

an electronic switch for connecting said ODT port and PDT port to said MDF port; and a controller in operative communication with said switch, ODT, PDT and MDF ports, said controller including a processor programmed to receive a predetermined signal from said ODT port and, in response, automatically establish a communication channel between said PDT port and said MDF port, and open a communication channel between said ODT port and said MDF port.

2. The cross-connect switch of claim 1 wherein each of said ODT, PDT and MDF ports comprise a tip port and ring port.

3. The cross-connect switch of claim 1 wherein said predetermined signal is a Mechanized Loop Testing tracking tone.

4. The cross-connect switch of claim 1 further comprising a first operator indicator and wherein said controller is programmed to activate said first operator indicator when said ODT port is in operative communication with said MDF port.

5. The cross-connect switch of claim 4 further comprising a second operator indicator and wherein said controller is programmed to activate said second operator indicator when said PDT port is in operative communication with said MDF port.

6. The cross-connect switch of claim 1, further comprising a power supply adapted to supply power to said switch and said controller.

* * * * *